United States Patent [19]

Volin

[11] 4,264,085

[45] Apr. 28, 1981

[54] WHEELCHAIR CONVENIENCE ATTACHMENTS

[76] Inventor: Frank Volin, 3221 Quitman St., Columbia, S.C. 29204

[21] Appl. No.: 31,833

[22] Filed: Apr. 20, 1979

[51] Int. Cl.³ .............................................. B62M 1/14

[52] U.S. Cl. ........................... 280/289 WC; 280/5.26; 280/5.28; 280/242 WC; 297/DIG. 4

[58] Field of Search ............... 280/5.32, 5.2, 242 WC, 280/289 WC, 209, 30, 31, 5.26, 5.28; 297/DIG. 4, 42, 43, 44, 45; 248/656, 421

[56] References Cited

U.S. PATENT DOCUMENTS

| | | | |
|---|---|---|---|
| 2,073,155 | 3/1937 | Ivey | 297/25 |
| 2,818,910 | 1/1958 | Hawkins | 297/DIG. 4 |
| 3,239,872 | 3/1966 | Kitrell | 280/5.32 |
| 3,968,991 | 7/1976 | Maclaren | 280/242 WC |
| 3,976,152 | 8/1976 | Bell | 280/242 WC |

FOREIGN PATENT DOCUMENTS

| | | | |
|---|---|---|---|
| 101758 | 10/1916 | United Kingdom | 301/37 SA |

*Primary Examiner*—John J. Love
*Assistant Examiner*—Randall A. Schrecengost
*Attorney, Agent, or Firm*—B. P. Fishburne, Jr.

[57] ABSTRACT

The commonplace laterally collapsible wheelchair is rendered more convenient and versatile by the addition thereto of several add-on attachments which can be readily installed by the purchaser of the chair at minimum cost and without structural alteration of the basic wheelchair. One or more of the attachments can be sold in "do-it-yourself" kits. The attachments include a chair width adjustment, curb climbing wheels, a quick removable seat back, wheel spoke protectors and a front wheel adjuster to compensate for inclines during use of the wheelchair.

4 Claims, 20 Drawing Figures

FIG 1
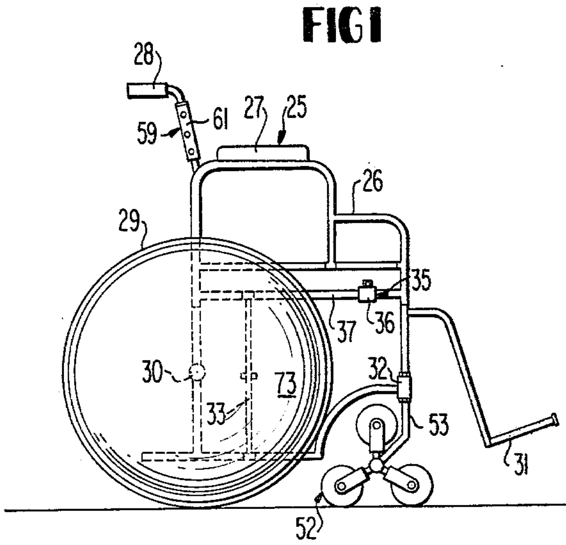
FIG 2
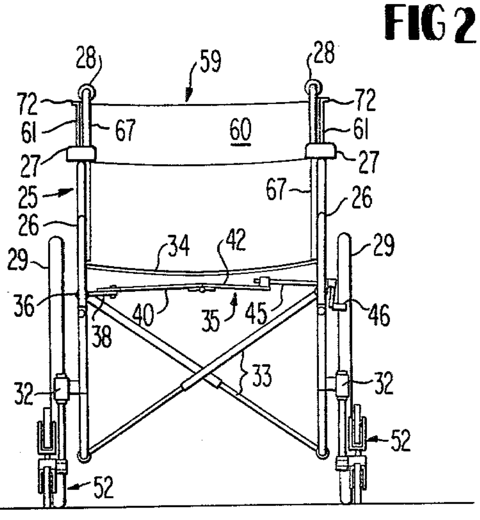
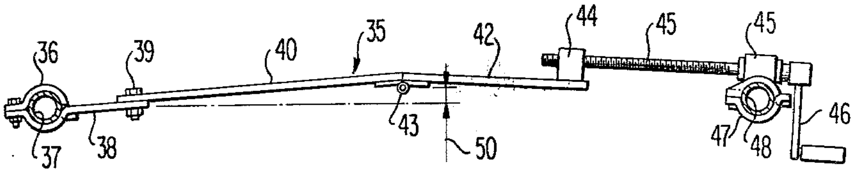
FIG 3
FIG 4
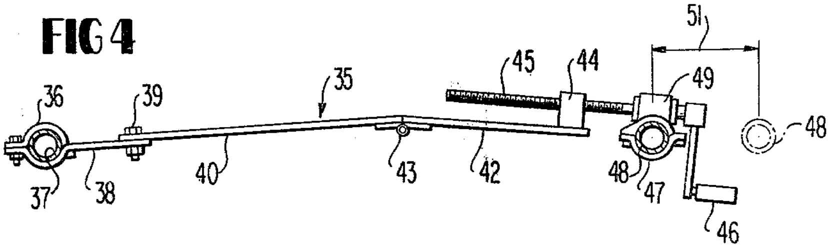
FIG 5
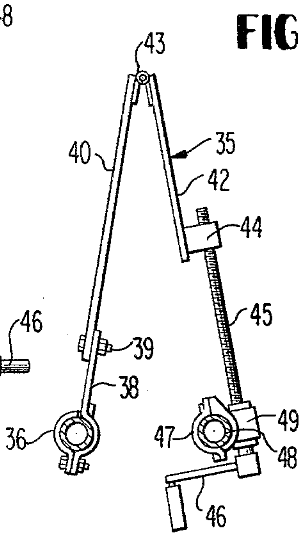
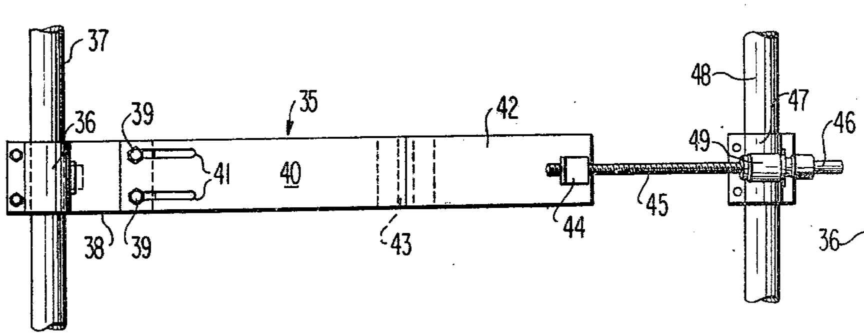
FIG 6

WHEELCHAIR CONVENIENCE ATTACHMENTS

BACKGROUND OF THE INVENTION

Some very sophisticated and extremely costly wheelchairs are known in the prior art. The most widely used type of wheelchair is a comparatively inexpensive laterally foldable, reasonably lightweight chair which can be carried in automobiles by users, as well as many other places where heavier, more elaborate chairs could not be taken. The most commonly used wheelchair, however, lacks many desirable convenience features, and the objective of this invention is to improve on the convenience and utility of the common type laterally folding wheelchair without even approaching the great cost of more sophisticated chairs which have been proposed in the art.

More particularly, it is the aim of the invention to provide a number of add-on attachment devices or kits which can be installed on wheelchairs by the purchasers or users thereof at relatively low cost and without necessitating a redesign or substantial modification of the basic chair structure. Among the provided "do-it-yourself" wheelchair attachments are a simple and reliable width adjuster enabling the chair to pass through narrow doorways and passages; a curb or step climbing front wheel arrangement; a quick removable chair back providing easy access to commodes, etc. in tight quarters; a wheel guard and strengthener; and a simplified front wheel adjuster which compensates for inclines by maintaining the chair seat substantially level.

The following prior United States patents are made of record herein under 37 C.F.R. 1.56: U.S. Pat. Nos. 2,847,058; 3,409,324; 3,666,292; 3,937,490; 3,976,152.

BRIEF DESCRIPTION OF THE DRAWINGS

FIG. 1 is a side elevation of the invention applied to a conventional type wheelchair.

FIG. 2 is a front elevation thereof.

FIG. 3 is an enlarged, vertical section showing the wheelchair width adjuster in an extended condition.

FIG. 4 is a similar view of the adjuster in a width reducing position.

FIG. 5 is a similar view of the adjuster when the wheelchair is folded.

FIG. 6 is a fragmentary plan view of the width adjuster as shown in FIG. 3.

DETAILED DESCRIPTION

Figure 7:
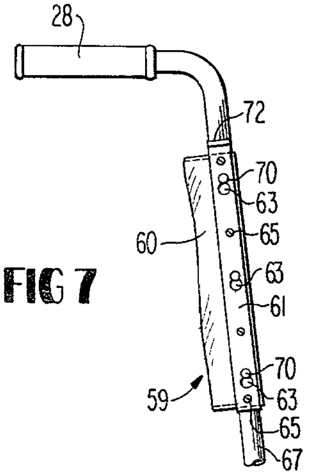
FIG. 7 is a fragmentary side elevation of a quick release backrest attachment.

Referring to the drawings in detail wherein like numerals designate like parts, a conventional laterally folding readily portable wheelchair 25 includes tubular vertical frame sides 26 having arm rests 27 and rear wheelchair guiding handles 28 rising from the frame sides 26. Rear main wheels 29 of the lightweight spoke type are conventionally journaled as at 30 on stub axles carried by the frame sides 26. The usual foot rests 31 are provided on the frame sides 26. Vertical axis sockets 32 for the customary front caster wheels of the chair are also secured to the frame sides 26 and spaced somewhat laterally outwardly thereof in substantial alignment with the rear wheels 29. The conventional wheelchair has a folding X-frame 33 disposed in a vertical plane substantially at the center of gravity of the chair. A flexible seat web 34 extends between the frame sides 26 with its opposite edges conventionally secured thereto. The construction thus far described is that of the most common type of folding wheelchair, and a more detailed description of the chair is unnecessary for a proper understanding of the invention.

A major feature of the invention is a simplified add-on chair width adjuster 35 shown in detail in FIGS. 3–5. This adjuster comprises a first swivel clamp 36 surrounding one horizontal side frame member 37 of the wheelchair rotatably substantially above the front wheel means of the chair. The first clamp 36 includes a generally level extension 38 extending transversely inwardly of the front-to-back frame bar 37 in use, and coupled adjustably as by bolts 39 with a longer hinge plate 40 having parallel adjustment slots 41 near its outer end to receive the locking bolts 39. By this means, the width adjuster 35 can be shortened or lengthened to accommodate varying widths of chairs.

The width adjuster 35 further comprises a somewhat shorter cooperating hinge plate 42 connected to the plate 40 by a hinge 43 and having a threaded lug 44 rising therefrom near its outer end, and receiving an adjusting screw shaft 45 having a crank handle 46.

The adjuster 35 has a second swivel clamp 47 at its end carrying the screw shaft 45 and embracing a second front-to-back frame bar 48 of the wheelchair parallel to the bar 37 at the far side of the chair. The swivel clamp 47 includes a top side swivel hub 49 for an unthreaded portion of screw shaft 45.

When the wheelchair is fully extended or open for use, FIG. 2, the two hinge plates 40 and 42 never assume a dead center relationship with the axis of hinge 43 and always remain above a level plane by a distance indicated by the arrows 50 in FIG. 3. When the occupant of the chair turns the crank handle 46 in the proper direction with very little manual effort, the overall width of the wheelchair can be reduced by a typical distance 51, FIG. 4, or by a slightly greater distance, if required. This enables the user of the chair to pass through many narrower passages which otherwise could not be negotiated without the width adjuster 35. As depicted in FIG. 2, the adjuster 35 lies near and below the flexible seat web 34 and near the front thereof for greatest convenience of operation.

Figure 11:
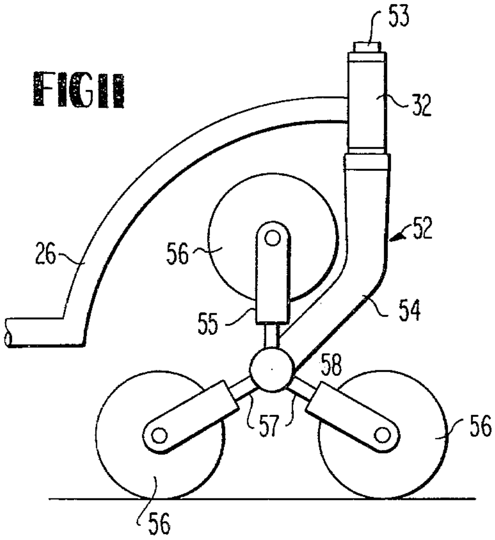
FIG. 11 is an enlarged fragmentary side elevation of a curb climbing front wheel attachment.
Figure 12:
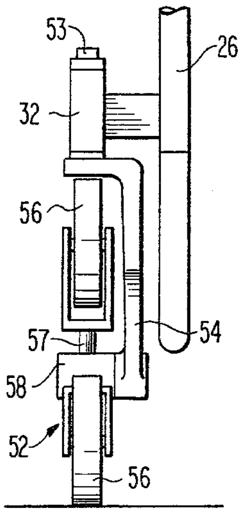
FIG. 12 is a front elevation thereof.
Figure 13:
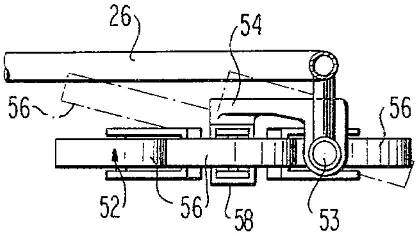
FIG. 13 is a plan view thereof, partly in section.

A second convenient attachment for the wheelchair in accordance with the invention is the provision thereon in lieu of the customary front caster wheels of step or curb climbing front wheel assemblies 52, the details of which are best shown in FIGS. 11–13. Each climbing wheel assembly 52 includes a vertical spindle 53 received in one of the sockets 32 in lieu of the standard wheels which are removed and set aside. A reversely inclined support arm 54 below the spindle 53 and preferably offset laterally therefrom, FIGS. 12 and 13, supports a triple climbing wheel unit 55 including circumferentially equidistantly spaced wheels 56 having radial support arms 57 attached to a common central hub 58. The common hub 58 has a transverse horizontal rotation axis at the lower end of the support arm 54 so that the three climbing wheels 56 can rotate as a unit with the hub 58 when climbing a curb or step in a known manner. By virtue of the offset relationship of the rotation spindle 53 to the common support arm 54 of the three wheels 56, each climbing wheel assembly 52 may caster in the manner shown in broken lines in FIG. 13 when the wheelchair is operated in a turning mode. It may be noted that the use of the climbing wheel assemblies 52 requires no structure modification of the basic chair, and should it be desired to return to the use of the standard caster wheels supplied by the chair manufacturer, the assemblies 52 are merely removed from the sockets 32 and the standard front wheels are placed in these sockets. Likewise, the width adjuster 35 described above requires no altering of the basic wheelchair. All of the convenience attachments herein are very easy to install by the purchaser without the need for skill or any special tools.

Figure 10:
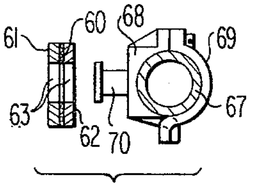
FIG. 10 is an exploded horizontal cross section of the quick release backrest attaching means.

Another important convenience attachment or kit forming a part of the invention is embodied in a quick release backrest 59 which is used in lieu of the standard non-adjustable and permanently attached backrest of the chair. The quick release backrest 59 includes a flexible backrest web 60 which is foldable with the wheelchair in the customary manner. The opposite side edge portions of the backrest web 60 are clamped firmly between opposing clamp bars 61 and 62 each having vertically spaced registering keyhole slots 63 formed therein. The web 60 is also apertured at 64 for registry with the keyhole slots 63. The two clamp bars 61 and 62 are secured tightly in opposing relationship on opposite sides of the web 60, FIG. 10, by means of short screws 65 engageable in threaded openings 66 of the clamp bar 62.

Figure 9:
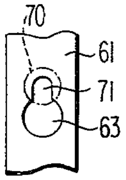
FIG. 9 is a fragmentary enlarged side elevation of a quick release clamp bar.
Figure 8:
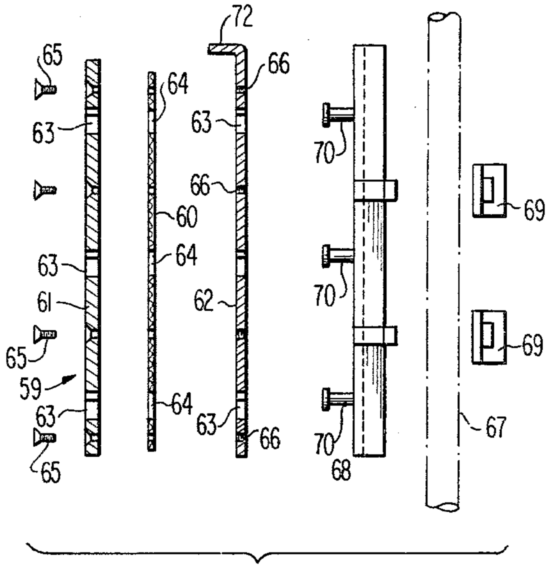
FIG. 8 is an exploded vertical cross sectional view of the same, partly in elevation.

On each side generally vertical guide arm 67 of the wheelchair depending from the handles 28 a half circle bar or channel 68 is secured firmly to the outer side of the arm 67 by cooperating clamp straps 69 or caps. The channel 68 on its outer side carries headed studs 70 in spaced relationship to register with the keyhole slots 63 of the assembled bars 61 and 62. The arrangement is such that the heads of studs 70 may enter and pass through the wider portions of keyhole slots 63 which are lowermost in use, FIGS. 7 and 9, and the shanks of the studs 70 may be received in the upper narrower portions 71 of the keyhole slots 63. To raise and lower the assembled clamp bars 61 and 62 at proper times relative to the arms 67 of the wheelchair, a short handle extension 72 projecting laterally outwardly of each arm 67 is provided on the top of the innermost clamp bar 62.

Thus, when the user of the chair seeking easy access to a commode or the like in tight quarters wishes to remove the backrest 59 from the chair, it merely necessitates a one hand operation to raise each clamping bar assembly by use of the handle extension 72 until the heads of studs 70 are aligned with the larger portions of keyhole slots 63, whereby the two sides of the backrest are easily and quickly separated from the chair and set aside temporarily. The chair occupant using the arm rests 27 is then enabled to slide rearwardly through the back of the chair and between the arms 67 without impediment.

Figure 14:
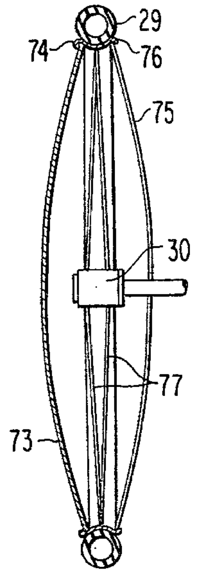
FIG. 14 is a vertical cross section through one wheelchair main wheel and a protector and strengthening attachment therefor.
Figure 15:
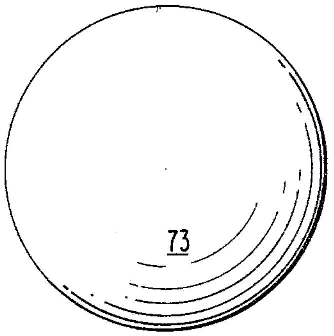
FIG. 15 is an elevational view of the outside wheel guard.
Figure 16:
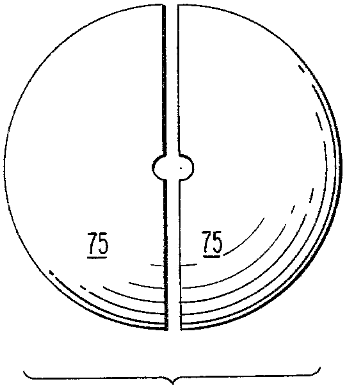
FIG. 16 is a similar view of the inside divided wheel guard.

A further convenience attachment for the wheelchair according to the invention comprises main wheel reinforcing and guard means shown in detail in FIGS. 14, 15 and 16. This guard means comprises an outer side one-piece circular concave sheet metal guard 73 which snappingly engages with the rim bead 74 of each main wheel 29. Similarly, a two-part concave inner side guard consists of semi-circular half sections 75 which snappingly engage with the interior rim bead 76 of each main wheel 29 of the chair. The guard structure protects the rather delicate wheel spokes 77 from damage which they frequently receive during rough usage and are costly to repair. The guard structure also materially strengthens the main wheels and increases their load bearing capacities, again without any alteration or damaging of the basic chair structure.

Another, and final, convenience attachment for wheelchairs in accordance with the invention is depicted in FIGS. 17A through 19. This attachment or improvement replaces the standard front caster wheels whose spindles are held in the upright bearing sockets 32, previously identified.

As shown in FIGS. 17A through 19, a front caster wheel 78 on each side of the wheelchair has its spindle 79 journaled in a socket bearing 80 having a transverse rocker shaft 81 held in a bearing structure 82 on each chair side frame 26. Connected to a hub 83 of the socket bearing 80 which rotates around the shaft 81 is an adjusting lever 84 which rises along the outer side of frame 26 to an elevation in ready reach of the chair occupant. A fixed notched control sector 85 for the lever 84 is suitably fixed to the frame side 26 and the several adjusting notches 86 thereof lockingly receive the lever 84 to hold it securely in selected angularly adjusted positions.

Figure 17A:
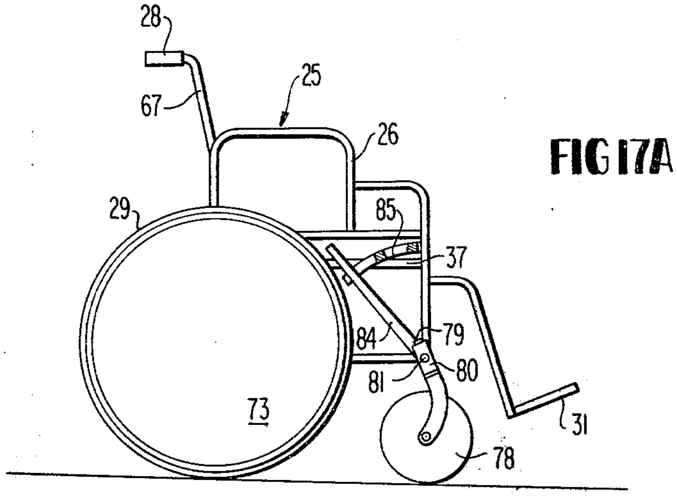
FIG. 17A is a side elevation of a front wheel adjuster to compensate for inclines in one operative position.
Figure 18:
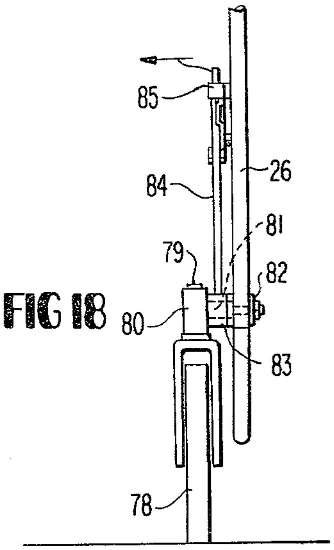
FIG. 18 is a front elevational view of the front wheel adjuster.
Figure 17B:
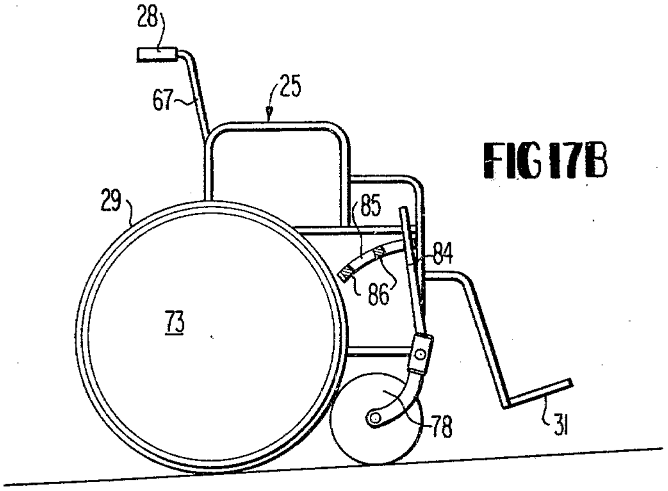
FIG. 17B is a further side elevation of the front wheel adjuster in another operative position.
Figure 19:
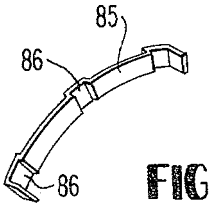
FIG. 19 is a perspective view of a control sector forming a part of the front wheel adjuster.

The purpose of this front wheel adjusting means is to level the wheelchair on inclined surfaces, as illustrated in FIGS. 17A and 17B, therefore compensating for the incline whether downhill or uphill and enhancing the comfort of the occupant of the wheelchair. As can be observed in the drawings, the front wheels 78 are bodily swingable by means of levers 84 around the axes of shafts 81 between the extreme positions shown in FIGS. 17A and 17B.

By means of the present invention, the commonest standard type folding wheelchair can have added thereto at minimum cost and minimum labor, without defacing the basic chair and without skill or special tools, several very important convenience attachments which render the chair more useful, more versatile and more convenient and comfortable. The advantages of the invention will be apparent to those skilled in the art of manufacturing wheelchairs as well as those who must use them.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a wheelchair of the laterally collapsing type including two upright substantially parallel side frame sections having front-to-back horizontal frame bars at a common elevation near the elevation of a flexible wheelchair seat, the improvement comprising a wheelchair occupant-operated chair width adjuster, said width adjuster comprising a pair of unequal length plates extending transversely of the chair and being hingedly connected at their interior ends to form a hinge joint which folds upwardly only when the wheelchair is collapsed laterally, the interior end faces of said plates abutting and forming an above-dead-center positive stop for said hinge joint when the wheelchair is in a laterally extended use condition, first and second ring clamps engaging said front-to-back frame members near their forward ends so that the width adjuster is located near the front of said seat, the first ring clamp being attached to the longer of said unequal length plates, a swivel bearing attached to the top of the second ring clamp, a crank operated screw shaft having free swiveled engagement within said bearing and having a screw-threaded portion projecting inwardly of the bearing and above the shorter of said unequal length plates, and a screw-threaded bearing for the threaded portion of said screw shaft threadedly engaging the latter and fixed to the top of the shorter of said plates near its outer end away from said hinge joint.

2. In a wheelchair as defined in claim 1, and a length adjusting means connected in the longer of said unequal length plates.

3. In a wheelchair as defined in claim 2, and the length adjusting means comprising longitudinal slot and clamping screw means in said plate.

4. In a wheelchair as defined in claim 1, the improvement further comprising a quick detachable backrest for the wheelchair including a flexible element extending between said side frame sections, abutment climbing front wheel units for the wheelchair, and main wheels for the wheelchair having removable reinforcing disc-like covers thereon.

* * * * *